US011462829B2

(12) United States Patent
Li

(10) Patent No.: US 11,462,829 B2
(45) Date of Patent: Oct. 4, 2022

(54) ANTENNA MODULE AND TERMINAL DEVICE

(71) Applicant: Beijing Xiaomi Mobile Software Co., Ltd., Beijing (CN)

(72) Inventor: Yueliang Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 156 days.

(21) Appl. No.: 17/101,669

(22) Filed: Nov. 23, 2020

(65) Prior Publication Data

US 2021/0399420 A1 Dec. 23, 2021

(30) Foreign Application Priority Data

Jun. 23, 2020 (CN) ......................... 202010584138.6

(51) Int. Cl.

| | |
|---|---|
| ***H01Q 1/24*** | (2006.01) |
| ***H01Q 21/28*** | (2006.01) |
| ***H04B 1/44*** | (2006.01) |
| ***H04M 1/02*** | (2006.01) |
| ***H01Q 5/314*** | (2015.01) |

(52) U.S. Cl.

CPC ............. *H01Q 5/314* (2015.01); *H01Q 1/243* (2013.01)

(58) Field of Classification Search

None

See application file for complete search history.

(56) References Cited

U.S. PATENT DOCUMENTS 7,148,847 B2 * 12/2006 Yuanzhu ................ H01Q 5/378 343/702

7,606,592 B2 * 10/2009 Becker ...................... H01P 5/12 330/95

(Continued)

FOREIGN PATENT DOCUMENTS

JP H1168102 A 3/1999

JP 2014508440 A 4/2014

(Continued)

OTHER PUBLICATIONS

Notification of Reason for Refusal for Korean Application No. 10-2020-0164106, dated Mar. 3, 2022.

(Continued)

*Primary Examiner* — Tuan A Tran

(74) *Attorney, Agent, or Firm* — Finnegan, Henderson, Farabow, Garrett & Dunner, L.L.P.

(57) ABSTRACT

An antenna module includes: a first radiator; a conductive sheet connected to the first radiator; a ground feeding point connected to the conductive sheet; a first feeding point connected to the first radiator; and at least one second feeding point apart from the first feeding point and connected to the conductive sheet at a position different from the ground feeding point, wherein the first feeding point, the first radiator, the conductive sheet, and the ground feeding point form a first path for radiating and receiving radio signals in a first frequency band, the second feeding point, the conductive sheet, and the first radiator form a second path for radiating and receiving radio signals in a second frequency band, and a central frequency of the first frequency band is not equal to that of the second frequency band.

20 Claims, 6 Drawing Sheets

(56) References Cited

U.S. PATENT DOCUMENTS

| | | | | |
|---|---|---|---|---|
| 9,088,069 | B2 * | 7/2015 | Bungo | H01Q 1/243 |
| 9,413,058 | B1 * | 8/2016 | Kuo | H01Q 5/335 |
| 9,583,835 | B2 * | 2/2017 | Lin | H01Q 9/0407 |
| 9,762,710 | B2 * | 9/2017 | Lee | H01Q 1/48 |
| 9,876,272 | B2 * | 1/2018 | Hu | H01Q 13/103 |
| 10,079,922 | B2 * | 9/2018 | Yli-Peltola | H01Q 1/243 |
| 10,205,220 | B2 * | 2/2019 | Van Wonterghem | H01Q 21/28 |
| 10,218,396 | B2 * | 2/2019 | Son | H01Q 9/0421 |
| 10,224,608 | B2 * | 3/2019 | Lee | H01Q 1/48 |
| 10,256,527 | B2 * | 4/2019 | Kim | H01Q 9/42 |
| 10,263,336 | B1 * | 4/2019 | Wong | H01Q 1/521 |
| 10,367,266 | B2 * | 7/2019 | Wong | H01Q 1/243 |
| 10,573,957 | B2 * | 2/2020 | Kang | H01Q 5/50 |
| 10,594,344 | B2 * | 3/2020 | Son | H01Q 9/0421 |
| 10,644,758 | B2 * | 5/2020 | Irci | H04B 5/0031 |
| 10,651,542 | B2 * | 5/2020 | Choi | H01Q 21/28 |
| 10,741,916 | B2 * | 8/2020 | Li | H01Q 1/521 |
| 10,763,573 | B2 * | 9/2020 | Liao | H01Q 1/38 |
| 10,790,575 | B2 * | 9/2020 | Kang | H01Q 1/243 |
| 10,804,617 | B2 * | 10/2020 | Zhou | H01Q 1/243 |
| 10,886,607 | B2 * | 1/2021 | Ayala Vazquez | H01Q 1/42 |
| 11,011,837 | B2 * | 5/2021 | Wu | H01Q 1/521 |
| 11,050,863 | B2 * | 6/2021 | Lee | H01Q 1/243 |
| 11,223,106 | B2 * | 1/2022 | Khripkov | H01Q 5/35 |
| 11,233,314 | B2 * | 1/2022 | Kang | H01Q 13/10 |
| 2016/0049719 | A1 * | 2/2016 | Tseng | H01Q 9/42 343/702 |
| 2016/0064820 | A1 * | 3/2016 | Kim | H01Q 9/045 343/767 |
| 2017/0244818 | A1 | 8/2017 | Kim et al. | |
| 2017/0302771 | A1 * | 10/2017 | Kim | H01Q 1/243 |
| 2018/0151943 | A1 | 5/2018 | Lee et al. | |
| 2020/0044311 | A1 | 2/2020 | Gu et al. | |

FOREIGN PATENT DOCUMENTS

| | | |
|---|---|---|
| KR | 20170098400 A | 8/2017 |
| KR | 20180060163 A | 6/2018 |

OTHER PUBLICATIONS

Extended European Search Report in European Application No. 20211935.0, dated May 26, 2021.

Notice of Reasons for Refusal for Japanese Application No. 2020-206162, dated Jul. 19, 2022.

* cited by examiner

ANTENNA MODULE AND TERMINAL DEVICE

CROSS-REFERENCE TO RELATED APPLICATIONS

This application claims priority to Chinese Patent Application No. 202010584138.6, filed on Jun. 23, 2020, the entire content of which is incorporated herein by reference.

TECHNICAL FIELD

The present disclosure relates to the field of communication technology, and more particularly to an antenna module and a terminal device.

BACKGROUND

With the rapid development of communication technology and the increase in communication demand, terminal devices have entered the era of 5th generation mobile communication technology (5G). In the same appearance size, the terminal device needs to increase layout space for antenna modules receiving and transmitting 5G signals, which is increasingly in conflict with the demand of terminal device towards full screen, dual speakers, dual microphones, large battery capacity and less slots. However, using traditional technologies, it is difficult to layout the antenna module and the space of the terminal device occupied by the antenna module is large.

SUMMARY

According to a first aspect of the present disclosure, an antenna module includes: a first radiator; a conductive sheet connected to the first radiator; a ground feeding point connected to the conductive sheet; a first feeding point connected to the first radiator; and at least one second feeding point, spaced apart from the first feeding point and connected to the conductive sheet at a position different from the ground feeding point. The first feeding point, the first radiator, the conductive sheet, and the ground feeding point form a first path for radiating and receiving radio signals in a first frequency band. The second feeding point, the conductive sheet, and the first radiator form a second path for radiating and receiving radio signals in a second frequency band. A central frequency of the first frequency band is not equal to that of the second frequency band.

According to a second aspect of the present disclosure, a terminal device includes the antenna module according to the first aspect.

It should be appreciated that, the general description above and the detail description below are explanatory and illustrative, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
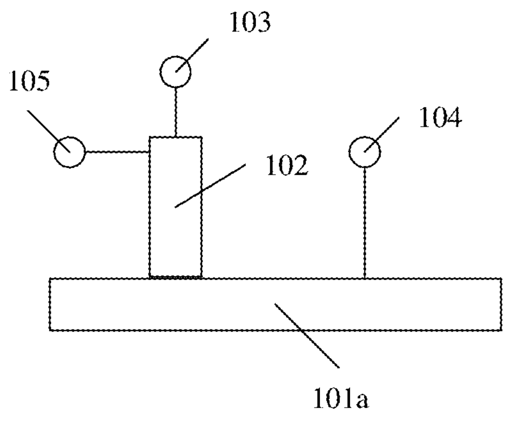
FIG. 1 is a schematic diagram of an antenna module according to an embodiment.

FIG. 1 is a schematic diagram of an antenna module according to an embodiment. As shown in FIG. 1, the antenna module includes: a first radiator 101*a,* a conductive sheet 102, a ground feeding point 103, a first feeding point 104 and at least one second feeding point 105. The conductive sheet 102 is connected to the first radiator 101*a.* The ground feeding point 103 is connected to the conductive sheet 102. The first feeding point 104 is connected to the first radiator 101*a.* The at least one second feeding point 105 is spaced apart from the first feeding point 104, and connected to the conductive sheet 102 at a position different from the ground feeding point 103. The first feeding point 104, the first radiator 101*a,* the conductive sheet 102, and the ground feeding point 103 are combined to form a first path for radiating and receiving radio signals in a first frequency band. The second feeding point 105, the conductive sheet 102, and the first radiator 101*a* are combined to form a second path for radiating and receiving radio signals in a second frequency band. A central frequency of the first frequency band is not equal to that of the second frequency band.

In the embodiment, the antenna module is configured to realize communication between devices, and widely used in terminal devices, such as smart phones, tablet computers or smart watches.

The first radiator 101*a* is connected to the conductive sheet 102 and the first feeding point 104, and configured to radiate or receive radio signals. The first radiator 101*a* may be a flexible printed circuit (FPC) or structure formed by laser direct structuring (LDS).

In some embodiments, a conductive frame or conductive rear shell of a terminal device may be directly used as the first radiator 101*a,* so as to reduce the space of the terminal device occupied by the first radiator 101*a.*

When the first radiator 101*a* is the FPC, and the antenna module is disposed in the smart phone, the first radiator 101*a* may be located between the printed circuit board and the rear shell of the terminal device. When the first radiator 101*a* is the structure formed by LDS, and the antenna module is disposed in the smart phone, the first radiator 101*a* can be plated on a middle frame or rear shell of the smart phone through LDS. It will be appreciated by those skilled in the art that the present disclosure is not limited thereto.

In some embodiments, the conductive sheet 102 is connected to the ground feeding point 103 and the second feeding point 105. In this way, signals flowing to the ground feeding point 103 and signals flowing to the second feeding point 105 can share the conductive sheet 102.

The conductive sheet 102 may be a conductive body made of a metal, an alloy or other materials. The conductive sheet 102 includes, but is not limited to, a conductive elastic sheet. The conductive elastic sheet may be a conductive sheet with certain elasticity and formed by bending a metal sheet or an alloy sheet. In this way, by connecting the first radiator 101*a* with the conductive elastic sheet, the connection can be maintained by taking advantage of the elasticity of the conductive elastic sheet, so as to improve the reliability of the connection, and further reduce the instability of the antenna module to receive and transmit radio signals caused by the posture change or fall of the terminal device having the antenna module.

The ground feeding point 103 is a grounding point of the antenna module. A high-frequency current of the first radiator 101*a* in the antenna module flows back to the ground through the conductive sheet 102 and the ground feeding point 103.

The first feeding point 104 and the second feeding point 105 are both feeding points of electric signals, which are signal feeding points different from the ground feeding points.

The first feeding point 104 and the second feeding point 105 are spaced apart from each other, and are used for transmitting different frequency bands. For example, the first feeding point 104 is a feeding point for transmitting the frequency in a GPS L5 frequency band, while the second feeding point 105 is a feeding point for transmitting the frequency in a Sub-6 GHz frequency band. Also for example, the first feeding point 104 is a feeding point for transmitting the frequency in a 2 GHz frequency band, while the second feeding point 105 is a feeding point for transmitting the frequency in the Sub-6 GHz frequency band. It will be appreciated by those skilled in the art that the present disclosure is not limited thereto.

The first feeding point 104 and the second feeding point 105 may also be set on the middle frame of the terminal device, and connected to a radio frequency (RF) front end component disposed on an inner circuit board of the terminal device through a feeder line. It will be appreciated by those skilled in the art that the present disclosure is not limited thereto.

In embodiments of the present disclosure, the first feeding point 104, the first radiator 101*a,* the conductive sheet 102, and the ground feeding point 103 are combined to form a first path for radiating and receiving radio signals in a first frequency band. That is, a first antenna may be formed by the first feeding point 104, the first radiator 101*a,* the conductive sheet 102, and the ground feeding point 103, and first antenna is used to radiate and receive the radio signals in the first frequency band. A ground returning path of the first antenna may be that the first feeding point 104 transmits a high-frequency current to the first radiator 101*a,* the first radiator 101*a* transmits the high-frequency current to the conductive sheet 102, and the conductive sheet 102 transmits the high-frequency current to the ground feeding point 103, thereby realizing the return of the high-frequency current to the ground.

For example, the first frequency band may include a frequency band of 2515 MHz to 2675 MHz corresponding to N41, a frequency band of 3400 MHz to 3600 MHz corresponding to N78, or a frequency band of 4800 MHz to 4900 MHz corresponding to N79. It will be appreciated by those skilled in the art that the present disclosure is not limited thereto.

In embodiments of the present disclosure, the second feeding point 105, the conductive sheet 102, and the first radiator 101*a* are combined to form a second path for radiating and receiving radio signals in a second frequency band. That is, a second antenna may be formed by the second feeding point 105, the conductive sheet 102, and the first radiator 101*a*, and the second antenna is used to radiate and receive the radio signals in the second frequency band. A radiation path of the second antenna may be that the second feeding point 105 transmits a high-frequency current to the first radiator 101*a* through the conductive sheet 102, and the first radiator 101*a* radiates the radio signals in the second frequency band under the excitation of the high-frequency current. Therefore, the first radiator 101*a* of the antenna module can not only radiate and receive the radio signals in the first frequency band, but also radiate and receive the radio signals in the second frequency band.

In some embodiments, the antenna module may include a plurality of the second feeding points, and the plurality of different second feeding points are connected to the conductive sheet 102 at positions different from the ground feeding point 103. The plurality of the second feeding points can be combined with the conductive sheet 102 and the first radiator 101*a* to obtain a plurality of different paths, and the plurality of different paths can radiate a plurality of radio signals in the second frequency band. For example, the plurality of different second feeding points include two different second feeding points, a path corresponding to one of which radiates radio signals in sub-band A of the second frequency band, and a path corresponding to the other one of which radiates radio signals in sub-band B of the second frequency band, where the sub-band A is different from the sub-band B.

For example, the second frequency band may be a frequency band of 450 MHz to 6000 MHz corresponding to Sub-6 GHz.

In embodiments of the present disclosure, the first feeding point 104, the first radiator 101*a,* the conductive sheet 102, and the ground feeding point 103 are combined to form the first path for radiating and receiving the radio signals in the first frequency band; and the second feeding point 105, the conductive sheet 102, and the first radiator 101*a* are combined to form the second path for radiating and receiving radio signals in the second frequency band. In other words, the conductive sheet 102 and the first radiator 101*a* are shared by the paths corresponding to different frequency bands. In this way, in embodiments of the present disclosure, by adding the second feeding point 105 connected to the conductive sheet 102, the antenna module can realize the radiation and reception of the radio signals in the second frequency band, on the basis of radiation and reception of the radio signals in the first frequency band. Therefore, by sharing the conductive sheet 102 and the first radiator 101*a,* the antenna module can realize the radiation and reception of radio signals in different frequency bands at the same time. Moreover, by sharing the first radiator 101*a* and the conductive sheet 102, there is no need to set respective first radiators for the first frequency band and the second frequency band, thereby reducing the number of the first radiators, reducing the space of the terminal device occupied by the antenna module, and improving space utilization rate of the terminal device.

Figure 2:
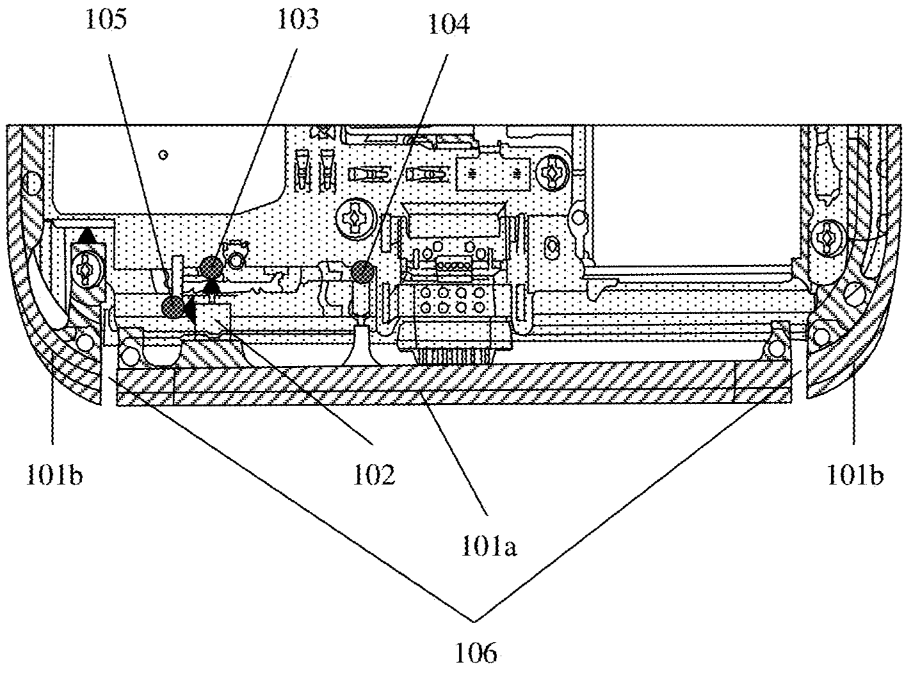
FIG. 2 is a schematic diagram of an antenna module according to an embodiment.

In some embodiments, as shown in FIG. 2, the antenna module further includes at least one second radiator 101*b* coupled to the first radiator 101*a*, and a gap 106 is present between the at least one second radiator 101*b* and the first radiator 101*a*.

In embodiments of the present disclosure, the antenna module may include one or more second radiators, each of which is coupled to the first radiator and has a gap with the first radiator.

In an embodiment, when the antenna module includes one second radiator, the second radiator and the first radiator are arranged side by side, and a gap is present between the first radiator and the second radiator.

In an embodiment, when the antenna module includes two second radiators, the two second radiators are respectively disposed at two opposite sides of the first radiator at intervals, or the two second radiators are respectively disposed at two adjacent sides of the first radiator at intervals, and a gap is present between each second radiator and the first radiator.

In an embodiment, the number of the gap between the second radiator and the first radiator is equal to the number of the second radiator. For example, when the radiator structure includes two second radiators, the two second radiators have two gaps with the first radiator.

In some embodiments, if a plurality of second radiators are located at the same side of the first radiator, the plurality of second radiators have a common gap with the first radiator, and a length of the common gap may be greater than that of a gap between a single second radiator and the first radiator.

The widths of a plurality of gaps formed by the plurality of the second radiators and the first radiator may be equal or unequal, which is not limited in embodiments of the present disclosure.

For example, the width of the gap described above may be set in the range of 0.5 mm to 0.2 mm, which is not limited in embodiments of the present disclosure.

In embodiments of the present disclosure, the first radiator is coupled with the second radiator, and the coupling process may include: when the first radiator converts an alternating current into an alternating magnetic field, the second radiator is able to generate an alternating current under the action of the alternating magnetic field and based on the alternating current to generate an alternating magnetic field, so that the second radiator can transmit and receive radio signals together with the first radiator.

In the embodiments, the first radiator, the second radiator and the gap are shared during the radiation and reception of the radio signals in the first frequency band and the radio signals in the second frequency band, so that the antenna module can additionally radiate the radio signals in the second frequency band, without increasing the number of the gap, the first radiator and the second radiator. Moreover, according to embodiments of the present disclosure, through transmitting and receiving the radio signals by the first radiator together with the plurality of the second radiators, both the transmitting/receiving power and the radiation area of the radio signals are increased, thereby improving the transmitting and receiving efficiency of the radio signals as well as improving the communication quality.

Figure 3:
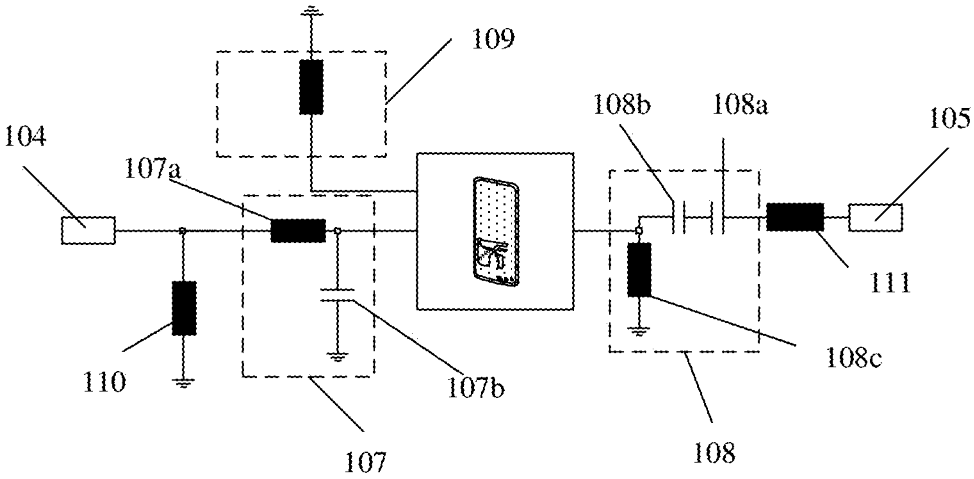
FIG. 3 is a circuit diagram of an antenna module according to an embodiment.

In some embodiments, as shown in FIG. 3, the antenna module further includes a first filter network 107, which is connected to the first feeding point 104 and configured to allow the radio signals in the first frequency band to pass and filter out the radio signals in the second frequency band.

In some embodiments, when the first feeding point 104 and the second feeding point 105 share the radiator to simultaneously receive and transmit radio signals, the radio signals in the second frequency band may affect a first RF front end component corresponding to the first feeding point 104. Accordingly, the first filter network 107 is provided to allow the radio signals in the first frequency band to pass and filters out the radio signals in the second frequency band. In this way, the influence of the radio signals in the second frequency band on the reception and transmission of the radio signals in the first frequency band can be reduced, so that the antenna module can better realize the simultaneous reception and transmission of the radio signals.

In some embodiments, filtering out the radio signals in the second frequency band by the first filter network 107 includes isolating the radio signals in the second frequency band to the ground by the first filter network 107.

In some embodiments, as shown in FIG. 3, the first filter network 107 includes: a first inductor 107*a* connected in series with the first feeding point 104; and a first capacitor 107*b* connected in parallel with the first feeding point 104.

In some embodiments, the first filter network 107 may also include a notch filter, which is used to eliminate signals at unneeded frequencies in the circuit.

In some embodiments, an inductance of the first inductor 107*a* and a capacitance of the first capacitor 107*b* are determined based on the radio signals in the first frequency band.

In embodiments of the present disclosure, when radio signals in the first frequency band is smaller than the radio signals in the second frequency band, the first filter network 107 may be set as a low-pass filter network for filtering out radio signals higher than the first frequency band.

For example, when the first filter network 107 is a low-pass filter network for filtering out radio signals higher than 3.5 GHz, the inductance of the first inductor 107*a* may be set to be 1 nh; and the capacitance of the first capacitor 107*b* may be set to be 2 pf.

In some embodiments, as shown in FIG. 3, the antenna module further includes a second filter network 108, which is connected to the second feeding point 105, and configured to allow the radio signals in the second frequency band to pass and filter out the radio signals in the first frequency band.

In some embodiments, when the first feeding point 104 and the second feeding point 105 share the radiator to simultaneously receive and transmit radio signals, the radio signals in the first frequency band may affect a second RF front end component corresponding to the second feeding point 105. Accordingly, the second filter network 108 is provided to allow the radio signals in the second frequency band to pass and filters out the radio signals in the first frequency band. In this way, the influence of the radio signals in the first frequency band on the reception and transmission of the radio signals in the second frequency band can be reduced, so that the antenna module can better realize the simultaneous reception and transmission of the radio signals.

In some embodiments, filtering out the radio signals in the first frequency band by the second filter network 108 includes isolating the radio signals in the first frequency band to the ground by the second filter network 108.

In some embodiments, as shown in FIG. 3, the second filter network 108 includes: a second capacitor 108*a*, a third capacitor 108*b*, and a second inductor 108*c*. The second capacitor 108*a* is connected to the second feeding point 105, and the third capacitor 108*b* is connected between the second inductor 108*c* and the second capacitor 108*a*.

In some embodiments, the second filter network 108 may also include a notch filter, which is used to eliminate signals at unneeded frequencies in the circuit.

In some embodiments, a capacitance of the second capacitor 108*a*, a capacitance of the third capacitor 108*b*, and an inductance of the second inductor 108*c* are determined based on the radio signals in the second frequency band.

In embodiments of the present disclosure, when the radio signals in the first frequency band is smaller than the radio signals in the second frequency band, the second filter network 108 may be set as a high-pass filter network for filtering out radio signals lower than the first frequency band.

For example, when the second filter network 108 is a high-pass filter network for filtering out radio signals lower than 3.5 GHz, the inductance of the second inductor 108*c* may be set to be 33 nh; and the capacitance of the second capacitor 108*a* and the capacitance of the third capacitor 108*b* both may be set to be 0.5 pf.

In some embodiments, the first filter network 107 and the second filter network 108 may both be an L-type high-pass filter, and embodiments of the present disclosure are not limited thereto.

In some embodiments, as shown in FIG. 3, the antenna module further includes: a first impedance matching network 110 and a second impedance matching network 111. The first impedance matching network 110 is connected to the first filter network 107, the second impedance matching network 111 is connected to the second filter network 108, and both the first impedance matching network 110 and the second impedance matching network 111 are used for impedance matching.

When an output impedance of the first RF front end component corresponding to the first feeding point 104 is 50 Ohms, the first impedance matching network 110 can use a Smith chart matching element to match the impedance of the first frequency band to near the region of 50 Ohms in the Smith chart. In this way, the energy generated by the first RF front end component can be radiated out through the first radiator and the second radiator to the greatest extent.

When an output impedance of the second RF front end component corresponding to the second feeding point 105 is 50 Ohms, the second impedance matching network 111 may also use a Smith chart matching element to match the impedance of the second frequency band to near the region of 50 Ohms in the Smith chart. In this way, the energy generated by the second RF front end component can be radiated out through the first radiator and the second radiator to the greatest extent.

In some embodiments, both the first impedance matching network 110 and the second impedance matching network 111 may be composed of an inductor and/or a capacitor. For example, as shown in FIG. 3, the first impedance matching network 110 may be formed by connecting a third inductor in series, and the second impedance matching network 111 may be formed by connecting a fourth inductor in parallel.

In embodiments of the present disclosure, an inductance of the third inductor is determined based on the radio signals of the first frequency band, and an inductance of the fourth inductor is determined based on the radio signals of the second frequency band. That is, the inductance of the third inductor is different when the first frequency band is different, and the inductance of the fourth inductor is different when the second frequency band is different. For example, the inductance of the third inductor may be set to be 3 nh, and the inductance of the fourth inductor may be set to be 1 nh. It will be appreciated by those skilled in the art that the present disclosure is not limited thereto.

Figure 4:
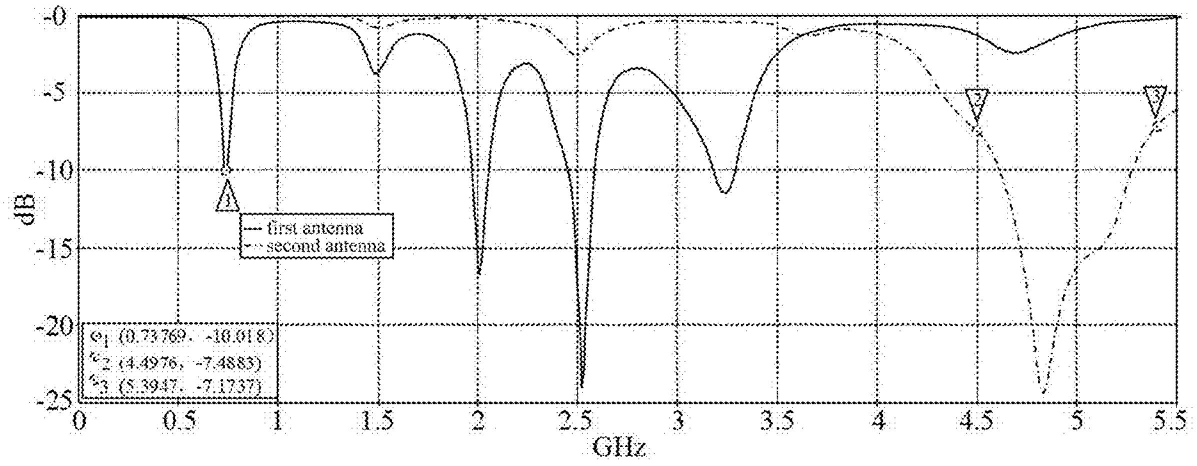
FIG. 4 is a return loss diagram of an antenna module according to an embodiment.

In embodiments of the present disclosure, the first feeding point, the first radiator, the conductive sheet and the ground feeding point form the first antenna for radiating and receiving the radio signals in the first frequency band; and the second feeding point, the conductive sheet and the first radiator form the second antenna for radiating and receiving radio signals in the second frequency band. FIG. 4 is a return loss diagram of the first antenna and the second antenna of the antenna module when the first filter network 107 and the second filter network 108 are added. As shown in FIG. 4, when the antenna module radiates and receives radio signals with a frequency greater than 3.5 GHz, the return loss of the first antenna is close to 0; when the antenna module radiates and receives radio signals with a frequency less than 3.5 GHz, the return loss of the second antenna is close to 0. It can be seen that radio signals with a frequency greater than 3.5 GHz in the first antenna are filtered out by the first filter network, and radio signals with a frequency lower than 3.5 GHz in the second antenna are filtered out by the second filter network, so that the antenna module can better realize the simultaneous reception and transmission of the radio signals.

In some embodiments, as shown in FIG. 3, the antenna module further includes a tuning component 109. The tuning component 109 is connected to the ground feeding point and includes a switching element. The tuning component 109 has different impedances in an on state and an off state of the switching element, and the antenna module is configured to receive and transmit radio signals in different sub-bands of the first frequency band according to the different impedances.

In embodiments of the present disclosure, the tuning component 109 may include the switching element and/or an impedance element, and the impedance element includes, but is not limited to, an inductor, a capacitor or a resistor. It will be appreciated by those skilled in the art that the present disclosure is not limited thereto.

In embodiments of the present disclosure, the first feeding point, the first radiator, the conductive sheet and the ground feeding point form the first antenna. When the switching element of the tuning component 109 is in the on state, the first antenna is in a first state; and when the switching element of the tuning component 109 is in the off state, the first antenna is in a second state.

In the first state, the first antenna is not grounded, and in the second state, the first antenna is grounded. When the first antenna is switched from the first state to the second state, the first antenna is switched from radiating and receiving a first sub-band in the first frequency band to radiating and receiving a second sub-band in the first frequency band. A central frequency of the first sub-band is less than that of the second sub-band. For example, when the first antenna is switched from the first state to the second state, the first antenna is switched from radiating a radio signal with a frequency of 0.65737 GHz in the first frequency band to radiating a radio signal with a frequency of 0.73769 GHz in the first frequency band.

Figure 5:
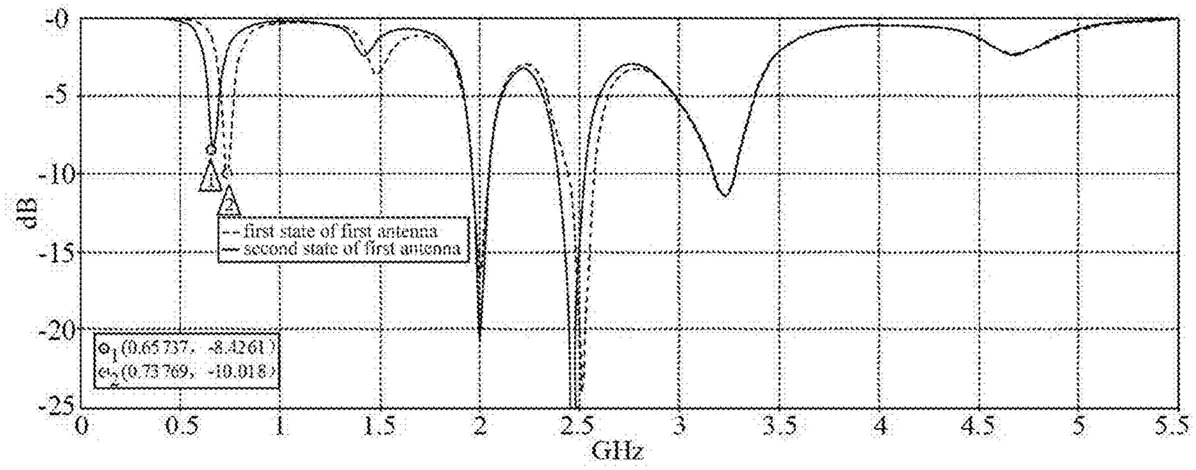
FIG. 5 is a return loss diagram of an antenna module according to an embodiment.

In embodiments of the present disclosure, the tuning component 109 further includes an inductor connected to the switching element. The inductor may be set according to actual needs. For example, an inductance of the inductor may be set to be 20 nh. For example, as shown in FIG. 5, the ground feed point is grounded through the inductor, and the first antenna is switched from radiating and receiving a radio signals with a frequency of 0.65737 GHz in the first frequency band to radiating and receiving a radio signal with a frequency of 0.73769 GHz in the first frequency band, thereby realizing the switch between different sub-bands in the first frequency band.

Through the tuning component 109, the antenna module can transmit and receive radio signals in different sub-bands of the first frequency band. In this way, the number of sub-bands transmitted and received by the antenna module can be increased, so that the antenna module covers more sub-bands.

Embodiments of the present disclosure further provide a terminal device, which includes the antenna module described above. The terminal device may be, e.g., a mobile terminal or a wearable electronic device. The mobile terminal includes, e.g., a mobile phone, a laptop, and a tablet computer. The wearable electronic device includes, e.g., a smart watch. It will be appreciated by those skilled in the art that embodiments of the present disclosure are not limited thereto.

In embodiments of the present disclosure, the first feeding point, the first radiator, the conductive sheet and the ground feeding point are combined to form the first path for radiating and receiving the radio signals in the first frequency band; and the second feeding point, the conductive sheet and the first radiator are combined to form the second path for radiating and receiving radio signals in the second frequency band. In other words, the conductive sheet and the first radiator are shared by the paths corresponding to different frequency bands. In this way, in embodiments of the present disclosure, just through adding the second feeding point connected to the conductive sheet, the antenna module can realize the radiation and reception of the radio signals in the second frequency band, on the basis of radiation and reception of the radio signals in the first frequency band. Therefore, by sharing the conductive sheet and the first radiator, the antenna module can realize the radiation and reception of radio signals in different frequency bands at the same time. Moreover, by sharing the first radiator and the conductive sheet, there is no need to set respective radiators for the first frequency band and the second frequency band, thereby reducing the number of the radiators, reducing the space of the terminal device occupied by the antenna module, and improving the space utilization rate of the terminal device.

In some embodiments, the antenna module includes a first radiator and a second radiator; the terminal device further includes a frame; the first radiator and the second radiator are different parts of a same edge of the frame; or the first radiator and the second radiator are parts of different edges of the frame, respectively.

The frame may be made of a metal, an alloy material or a conductive plastic and have a conductive function.

The shape of the frame may be set according to the needs of users. For example, the frame of the terminal device may be set as a rectangular shell. It will be appreciated by those skilled in the art that the present disclosure is not limited thereto.

In some embodiments, the first radiator and the second radiator are different parts of the same edge of the frame. For example, when the frame is in a rectangular shape, the first radiator and the second radiator may be different parts of a shorter edge of the frame or may be different parts of a longer edge of the frame. It will be appreciated by those skilled in the art that embodiments of the present disclosure are not limited thereto.

In some embodiments, the first radiator and the second radiator are parts of different edges of the frame, respectively. For example, the first radiator and the second radiator may be parts of adjacent edges of the frame, respectively. As an example, when the frame is in a rectangular shape, the first radiator may be a part of a longer edge of the frame, and the second radiator may be a part of a shorter edge of the frame. Also for example, the first radiator may be a part of a shorter edge of the frame, and the second radiator may be a part of a longer edge of the frame. It will be appreciated by those skilled in the art that embodiments of the present disclosure are not limited thereto.

In embodiments of the present disclosure, the frame is directly used as the first radiator and the second radiator of the antenna module, which reduces the space of the terminal device occupied by the antenna module, thereby solving the problem that a larger space of the terminal device is occupied by the antenna module due to the provision of additional radiator, and further improving the space utilization rate of the terminal device.

In some embodiments, a gap is present between different parts of the frame corresponding to the first radiator and the second radiator.

In embodiments of the present disclosure, when the first radiator and the second radiator are different parts of a same edge of the frame, the gap is present at the same edge. When the first radiator and the second radiator are parts of different edges of the frame, respectively, the gap may be present between the different edges.

When the antenna module radiates and receives radio signals in different frequency bands, in addition to sharing the conductive sheet, the first radiator and the second radiator, the antenna module can also share the gap between the first radiator and the second radiator, and radiate the radio signals in different frequency bands through the gap.

It should be noted that terms "first", "second", "third" and "fourth" are used herein for the convenience of description and have no other special meanings, they are not intended to indicate or imply relative importance or significance or to imply the number of indicated technical features.

Figure 6:
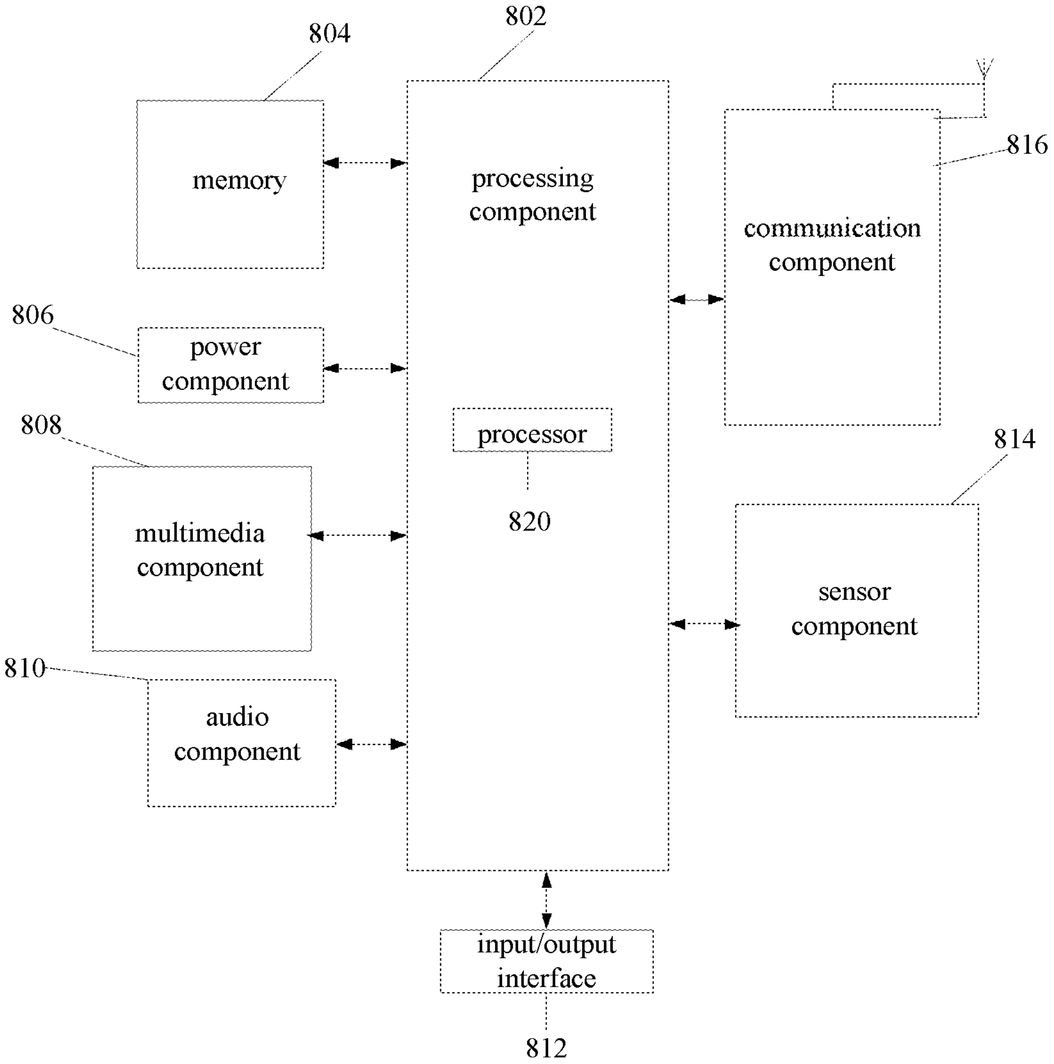
FIG. 6 is a block diagram of a terminal device according to an embodiment.

FIG. 6 is a block diagram of a terminal device according to an embodiment. For example, the terminal device may be a mobile phone, a computer, a digital broadcast terminal, a messaging device, a gaming console, a tablet, a medical device, exercise equipment, a personal digital assistant, and the like.

Referring to FIG. 6, the terminal device may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device. Examples of such data include instructions for any applications or methods operated on the terminal device, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EE- PROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device. The power component 806 may include a power management system, one or more power sources, and any other components associated with the generation, management, and distribution of power in the terminal device.

The multimedia component 808 includes a screen providing an output interface between the terminal device and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the terminal device is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device. For instance, the sensor component 814 may detect an open/closed status of the terminal device, relative positioning of components, e.g., the display and the keypad, of the terminal device, a change in position of the terminal device or a component of the terminal device, a presence or absence of user contact with the terminal device, an orientation or an acceleration/deceleration of the terminal device, and a change in temperature of the terminal device. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal device and other devices. For example, the communication component 816 includes the antenna module described above. The terminal device can access a wireless network based on a communication standard, such as WiFi, 4G, or 5G, or a combination thereof. In one exemplary embodiment, the communication component 816 receives a broadcast signal or broadcast associated information from an external broadcast management system via a broadcast channel In one exemplary embodiment, the communication component 816 further includes a near field communication (NFC) module to facilitate short-range communications. In one exemplary embodiment, the communication component 816 may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An antenna module, comprising:

a first radiator;

a conductive sheet, connected to the first radiator;

a ground feeding point, connected to the conductive sheet;

a first feeding point, connected to the first radiator; and at least one second feeding point, spaced apart from the first feeding point, and connected to the conductive sheet at a position different from the ground feeding point, wherein the first feeding point, the first radiator, the conductive sheet, and the ground feeding point form a first path for radiating and receiving radio signals in a first frequency band, the second feeding point, the conductive sheet, and the first radiator form a second path for radiating and receiving radio signals in a second frequency band, and wherein a central frequency of the first frequency band is not equal to that of the second frequency band.

2. The antenna module according to claim 1, further comprising: at least one second radiator coupled to the first radiator, wherein a gap is present between the at least one second radiator and the first radiator.

3. The antenna module according to claim 1, further comprising: a first filter network, connected to the first feeding point, and configured to allow the radio signals in the first frequency band to pass and filter out the radio signals in the second frequency band.

4. The antenna module according to claim 3, wherein the first filter network comprises:

an inductor connected in series with the first feeding point; and a capacitor connected in parallel with the first feeding point.

5. The antenna module according to claim 4, wherein an inductance of the inductor and a capacitance of the capacitor are determined based on the radio signals in the first frequency band.

6. The antenna module according to claim 3, further comprising: a second filter network, connected to the second feeding point, and configured to allow the radio signals in the second frequency band to pass and filter out the radio signals in the first frequency band.

7. The antenna module according to claim 6, wherein the second filter network comprises:

a first capacitor, connected to the second feeding point;

an inductor; and a second capacitor, connected between the inductor and the first capacitor.

8. The antenna module according to claim 7, wherein a capacitance of the first capacitor, a capacitance of the second capacitor and an inductance of the inductor are determined based on the radio signals in the second frequency band.

9. The antenna module according to claim 6, further comprising: a second impedance matching network connected to the second filter network.

10. The antenna module according to claim 9, wherein the second impedance matching network includes at least one of an inductor or a capacitor.

11. The antenna module according to claim 6, wherein a central frequency of the first frequency band is smaller than that of the second frequency band, and the second filter network is a high-pass filter network for filtering out radio signals lower than the first frequency band.

12. The antenna module according to claim 3, further comprising: a first impedance matching network connected to the first filter network.

13. The antenna module according to claim 12, wherein the first impedance matching network includes at least one of an inductor or a capacitor.

14. The antenna module according to claim 3, wherein a central frequency of the first frequency band is smaller than that of the second frequency band, and the first filter network is a low-pass filter network for filtering out radio signals higher than the first frequency band.

15. The antenna module according to claim 1, further comprising:

a tuning component, connected to the ground feeding point and comprising a switching element, wherein the tuning component has different impedances in an on state and an off state of the switching element, and the antenna module is configured to receive and transmit radio signals in different sub-bands of the first frequency band according to the different impedances.

16. The antenna module according to claim 1, further comprising: two second radiators coupled to the first radiator, wherein a gap is present between each second radiator and the first radiator, and the two second radiators are respectively disposed at two opposite sides of the first radiator.

17. The antenna module according to claim 1, further comprising: two second radiators coupled to the first radiator, wherein a gap is present between each second radiator and the first radiator, and the two second radiators are respectively disposed at two adjacent sides of the first radiator.

18. A terminal device, comprising an antenna module comprising:

a first radiator;

a conductive sheet, connected to the first radiator;

a ground feeding point, connected to the conductive sheet;

a first feeding point, connected to the first radiator; and at least one second feeding point, spaced apart from the first feeding point, and connected to the conductive sheet at a position different from the ground feeding point, wherein the first feeding point, the first radiator, the conductive sheet and the ground feeding point form a first path for radiating and receiving radio signals in a first frequency band, the second feeding point, the conductive sheet and the first radiator form a second path for radiating and receiving radio signals in a second frequency band, and wherein a central frequency of the first frequency band is not equal to that of the second frequency band.

19. The terminal device according to claim 18, further comprising a frame, wherein the antenna module further comprises a second radiator; and the first radiator and the second radiator are different parts of a same edge of the frame, or parts of different edges of the frame, respectively.

20. The terminal device according to claim 19, wherein a gap is present between different parts of the frame corresponding to the first radiator and the second radiator.

* * * * *